United States Patent
Carrithers et al.

(10) Patent No.: US 12,011,933 B2
(45) Date of Patent: Jun. 18, 2024

(54) FLUID RESERVOIR WITH SELF-PRIMING CAPABILILTY

(71) Applicant: Funai Electric Co., Ltd., Osaka (JP)

(72) Inventors: Adam D. Carrithers, Lexington, KY (US); Bruce A. DeBoard, Lexington, KY (US); Sam Norasak, Lexington, KY (US)

(73) Assignee: Funai Electric Co., Ltd. (JP)

( * ) Notice: Subject to any disclaimer, the term of this patent is extended or adjusted under 35 U.S.C. 154(b) by 114 days.

(21) Appl. No.: 17/805,528

(22) Filed: Jun. 6, 2022

(65) Prior Publication Data

US 2023/0391101 A1    Dec. 7, 2023

(51) Int. Cl.
   B41J 2/175    (2006.01)

(52) U.S. Cl.
   CPC ....... B41J 2/17596 (2013.01); B41J 2/17503 (2013.01); B41J 2/17513 (2013.01); B41J 2/17536 (2013.01); B41J 2002/17516 (2013.01); B41J 2/17543 (2013.01)

(58) Field of Classification Search
   CPC ............... B41J 2/17596; B41J 2/17513; B41J 2002/17516; B41J 2/17503; B41J 2/17536; B41J 2/17543
   See application file for complete search history.

(56) References Cited

U.S. PATENT DOCUMENTS

| | | | |
|---|---|---|---|
| 5,720,728 A * | 2/1998 | Ford | A61M 3/0233 604/141 |
| 5,725,499 A | 3/1998 | Silverstein et al. | |
| 5,774,154 A | 6/1998 | Underwood | |
| 6,010,211 A * | 1/2000 | Betschon | B41J 2/17556 347/86 |
| 6,257,713 B1 | 7/2001 | Ahn | |
| 2005/0106753 A1 | 5/2005 | Wu et al. | |
| 2007/0040877 A1* | 2/2007 | Kachi | B41J 2/17566 347/85 |
| 2007/0076065 A1 | 4/2007 | Campbell et al. | |
| 2010/0245459 A1* | 9/2010 | Kanbe | B41J 2/1752 347/19 |

FOREIGN PATENT DOCUMENTS

| | | | | |
|---|---|---|---|---|
| CN | 114559748 A | * | 5/2022 | ............. B41J 2/175 |
| CN | 114559748 A | | 5/2022 | |
| JP | 2001334682 A | * | 12/2001 | ............. B41J 2/175 |

* cited by examiner

*Primary Examiner* — Yaovi M Ameh
(74) *Attorney, Agent, or Firm* — Luedeka Neely, P.C.

(57) ABSTRACT

A fluid reservoir for a fluid ejection head structure and a method for priming a fluid ejection head for a fluid dispensing device. The fluid reservoir includes an enclosed fluid cavity therein configured for containing fluid, a fluid outlet in fluid flow communication with the enclosed fluid cavity, and a flow inducing pump attached to the fluid reservoir opposite the fluid outlet.

21 Claims, 11 Drawing Sheets

FLUID RESERVOIR WITH SELF-PRIMING CAPABILITY

TECHNICAL FIELD

The disclosure pertains to a fluid reservoir having self-priming capabilities for use in providing fluid to a fluid ejection device. The fluid reservoir may be pre-filled with a fluid to be ejected or may be filled by a user prior to use.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to evaluate their effect and performance on the samples. Traditionally, pipettes—manually or electromechanically actuated—are used to deposit trace substances into these assay samples. The total volume of a test fluid produced for an assay is dictated by the ability to achieve a desired ratio of reagents with respect to the least of the reagents. Due to the small-scale volumetric limitations of pipettes, it is often necessary to create an excess of testing fluid to achieve the proper ratio of reagents.

It is well known that thermal inkjet technology is capable of precisely distributing picolitre-sized droplets of a jetting fluid. The precision and speed offered by inkjet technology makes it a promising candidate for increasing throughput of assay samples while decreasing the amount of wasted sample. In a conventional thermal-jet printer, a jetting fluid is typically prefilled into a printhead before reaching the end-user. However, it is impractical to use a prefilled cartridge in the life-sciences field where it is desirable to produce testing solutions on site.

While inkjet printing may be a viable method of administering chemical and biological assay analysis, inkjet printing products currently on the market use specialty printers and specially designed printheads which are cost prohibitive to some researchers. To reduce the cost of manufacturing and cost to the end-user, it is desirable to use pre-existing standard inkjet printers instead of specially designed printing systems. To enable the use of standard inkjet printers in the life science field, it is necessary to modify the printhead fluid reservoir bodies so that the pre-existing fluid reservoir form factors of the fluid reservoir bodies are maintained while allowing the fluid reservoir bodies to be easily filled with custom jetting fluids.

One problem with the use of the use of fluid reservoir bodies that are not filled with fluid at the time of manufacture is that it is difficult to prime the ejection head with the later filled fluid. Another problem with later filled fluid reservoir bodies is that the fluid chamber in the ejection head can only hold a miniscule amount of fluid. The fluid chamber of the ejection head is important in providing fluid to be ejected through nozzle holes in a nozzle plate of the ejection head and in maintaining an adequate backpressure to prevent fluid from drooling out of the nozzle plate. Accordingly, ejecting a precise liquid quantity from the ejection head requires consistency in the liquid flow from the fluid reservoir or fluid tank attached to the ejection head. What is needed, therefore, is an apparatus and method that will provide a sufficient amount of fluid to be dispensed while maintaining a constant fluid flow, and that will provide a suitable back pressure on the fluid to prevent drooling of fluid from the nozzle plate of the ejection head.

Accordingly, embodiments of the disclosure provide a fluid reservoir for a fluid ejection head structure and a method for priming a fluid ejection head for a fluid dispensing device. The fluid reservoir includes an enclosed fluid cavity therein configured for containing fluid, a fluid outlet in fluid flow communication with the enclosed fluid cavity, and a flow inducing pump attached to the fluid reservoir opposite the fluid outlet.

In some embodiments, the fluid reservoir includes a fluid to be dispensed by a fluid ejection device.

In some embodiments, the enclosed fluid cavity is filled with a backpressure device. In other embodiments, the backpressure device is a fluid permeable foam. In some embodiments, the flow inducing pump further includes a deformable bladder configured for compressing the fluid permeable foam to induce fluid flow through the fluid outlet. In some embodiments, the backpressure device is a fluid-fillable, spring-loaded bladder. In some embodiments, a pressure relief valve is provided in flow communication with the deformable bladder to provide a predetermined pressure in the deformable bladder.

In some embodiments, the fluid reservoir has a rectangular prism-shaped body having a tab thereon configured for positively attaching the fluid reservoir to the fluid ejection head structure. In other embodiments, the fluid reservoir has a cylindrical body having threads thereon for threadingly attaching the fluid reservoir to the fluid ejection head structure.

In some embodiments, the fluid reservoir has an O-ring seal configured for sealing the fluid reservoir to the fluid ejection head structure.

In some embodiments, the fluid reservoir has a fluid filling port thereon for filling or refilling the fluid reservoir with fluid.

In some embodiments, there is provided a fluid dispense cartridge having a fluid ejection head and at least one open chamber therein configured to accept a fluid reservoir, wherein the fluid reservoir has an enclosed fluid cavity therein configured for containing fluid, a fluid outlet in fluid flow communication with the enclosed fluid cavity, and a flow inducing pump attached to the fluid reservoir opposite the fluid outlet.

Another embodiment of the disclosure provides a method for priming a fluid ejection head for a fluid dispensing device. The method includes providing a fluid dispense structure having a fluid ejection head thereon. The fluid reservoir is attached to the fluid dispense structure, wherein the fluid reservoir has an enclosed fluid cavity therein containing fluid, a fluid outlet in fluid flow communication with the enclosed fluid cavity, and a flow inducing pump attached to the fluid reservoir opposite the fluid outlet. The flow inducing pump is activated to cause fluid to flow from the outlet of the fluid reservoir into the fluid ejection head to prime the fluid ejection head with fluid from the fluid reservoir.

In some embodiments, the fluid reservoir is pre-filled with the fluid to be dispensed by the fluid dispensing device.

In some embodiments, the fluid reservoir is filled with fluid to be dispensed by the fluid dispensing device prior to attaching the fluid reservoir to the fluid dispense structure.

In some embodiments, the fluid dispense structure includes one or more open chambers therein, further including inserting a fluid reservoir into each of the one or more open chambers; and activating the flow inducing pump on each fluid reservoir.

In some embodiments, each fluid reservoir contains a different fluid.

An advantage of the disclosed embodiments, is that perishable fluids may be used by filling the fluid reservoirs on site rather than shipping pre-filled fluid reservoirs. Also, since fluid ejection head chips have a lifetime that outlasts the amount of fluid provided in conventional fluid cartridges, the fluid ejection head chips may be reused by providing less costly fluid reservoirs rather than by providing pre-filled fluid cartridges containing the fluid ejection head chips. Packaging and shipping costs may also be reduced by only shipping the fluid reservoirs rather than the entire cartridge and ejection head chip which requires careful packaging and handling to avoid damage to the ejection head chip. Since the fluid cartridges are not filled with fluid until the time of use, there is less problem of solids in the fluid settling out and adversely affecting the fluid ejector performance. Also, there may be less swelling of the fluid cartridge body and thus less bowing of the ejection head when ejecting solvent containing fluids since the fluids are only introduced to the fluid cartridge just prior to use rather than over a prolonged period of time. The pump attached to the fluid reservoir may be effective in minimizing ejection head priming issues and also minimizing the amount of air trapped in the nozzles of the ejection head.

DETAILED DESCRIPTION OF EMBODIMENTS

Figure 1:
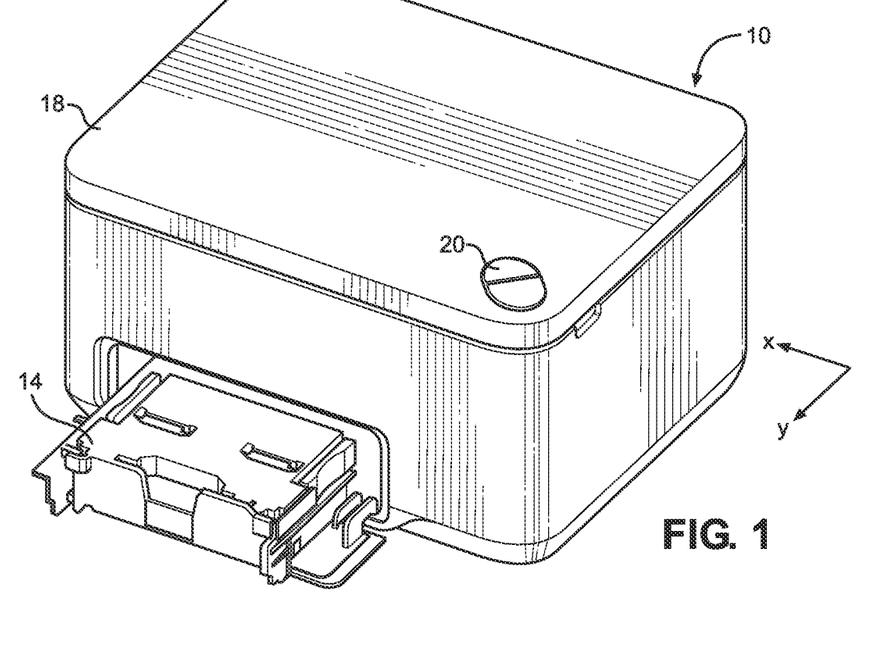
FIG. 1 is a perspective view, not to scale, of a fluid dispense device for a fluid reservoir according to an embodiment of the disclosure.
Figure 2:
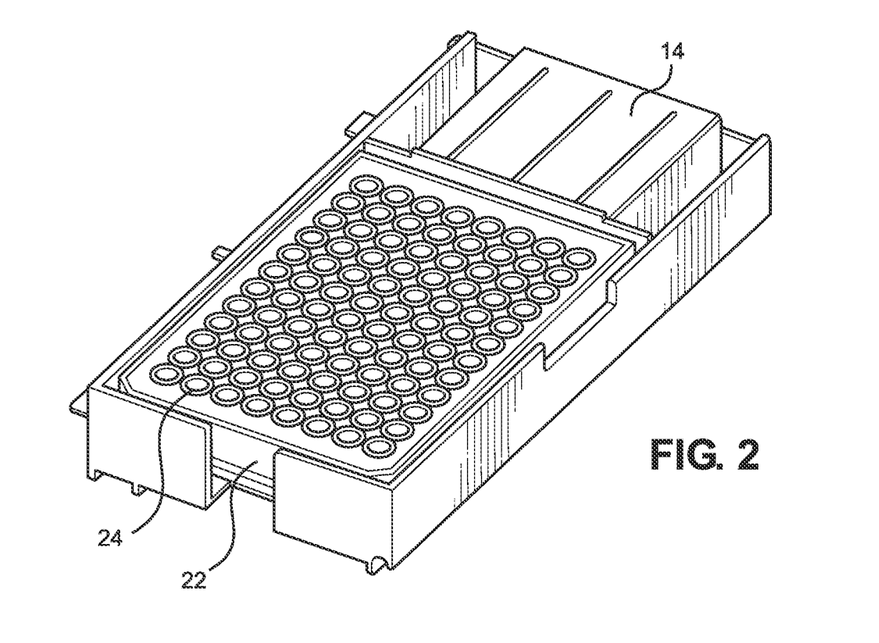
FIG. 2 is a perspective view, not to scale, of a tray and micro-well plate for use with the fluid dispense device of FIG. 1.

With reference to FIGS. 1-2 there is shown a digital dispense device 10 for accurately dispensing an amount of one or more fluids onto a substrate. Unlike the high-end digital dispense devices, the device 10 is based on an ejection head that moves back and forth in a first x direction and a tray 14 for moving a substrate that moves back and forth in a second y direction orthogonal to the first direction during the fluid dispense operation. The device 10 can accept open and closed fluid dispense cartridges rather than just open fluid dispense cartridges. The tray 14 is adaptable to a wide variety of substrates including, but not limited to, micro-well plates, glass slides, electronic circuit boards and the like. The fluid dispense cartridge containing a fluid ejection head and a cartridge movement mechanism are contained in a rectangular prism-shaped box 18. An activation switch 20 is included on the box 18 for activating the device 10.

FIG. 2 illustrates a tray 14 for holding a micro-well plate 22 containing wells 24 therein for use with the digital dispense device 10 to dispense fluid into the wells 24 of the micro-well plate or onto the glass slides. The tray 14 may include adapters for different size micro-well plates or for holding slides or other substrates for deposit of fluid thereon.

Figure 3:
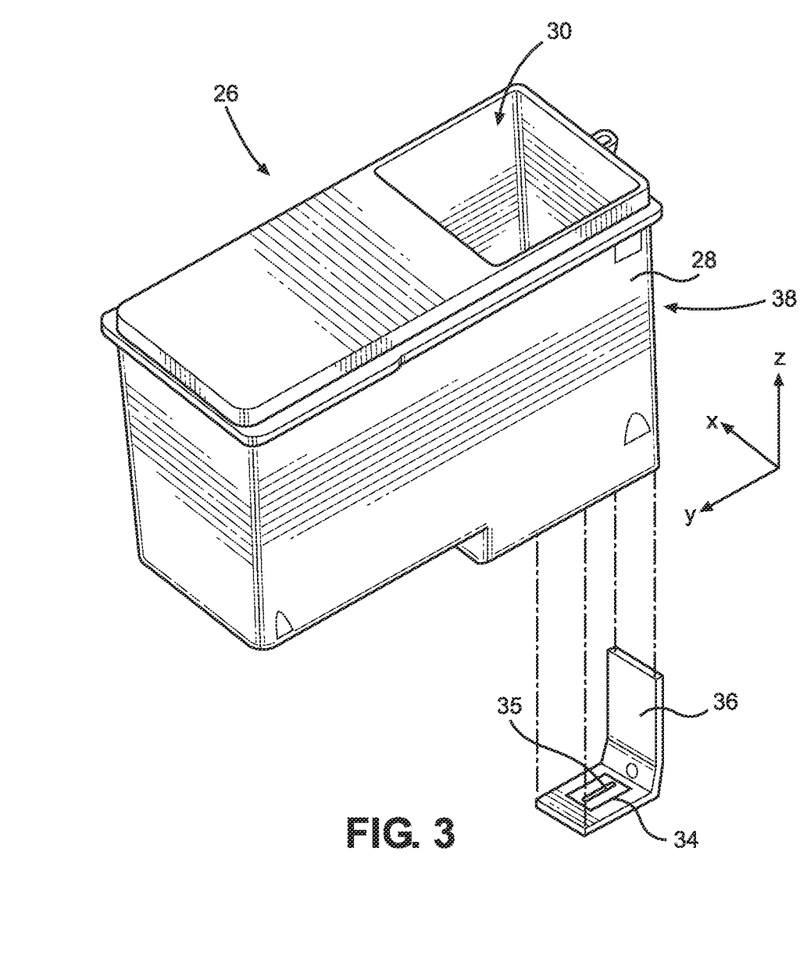
FIG. 3 is a perspective view, not to scale, of a fluid dispense cartridges for use with a fluid reservoir according to the disclosure.
Figure 4:
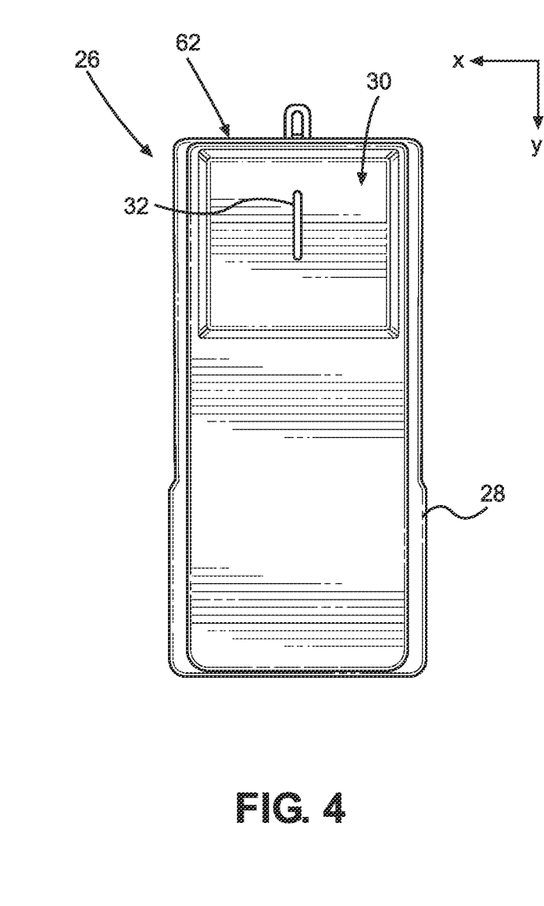
FIG. 4 is a top plan view, not to scale, of the fluid dispense cartridge of FIG. 3.

Fluid dispense cartridges for use with the digital dispense device 10 of FIG. 1 are illustrated in FIGS. 3-6. FIG. 3 is a perspective view, not to scale of a single chamber fluid dispense cartridge 26 according to one embodiment of the disclosure. The cartridge 26 has a unitary molded body 28 that provides a single open chamber 30 therein. The open chamber 30 has a fluid supply slot 32 (FIG. 4) therein for flow of fluid from the chamber 30 to an ejection head chip 34 containing one fluid ejector array 35 attached adjacent to the fluid supply slot 32. The ejection head chip 34 is electrically connected to a flexible circuit 36 that is attached to a front wall 38 of the unitary molded body 28. FIG. 4 is a top plan view of the single chamber cartridge 26 of FIG. 3 showing the position of a fluid supply slot 32 therein.

Figure 5:
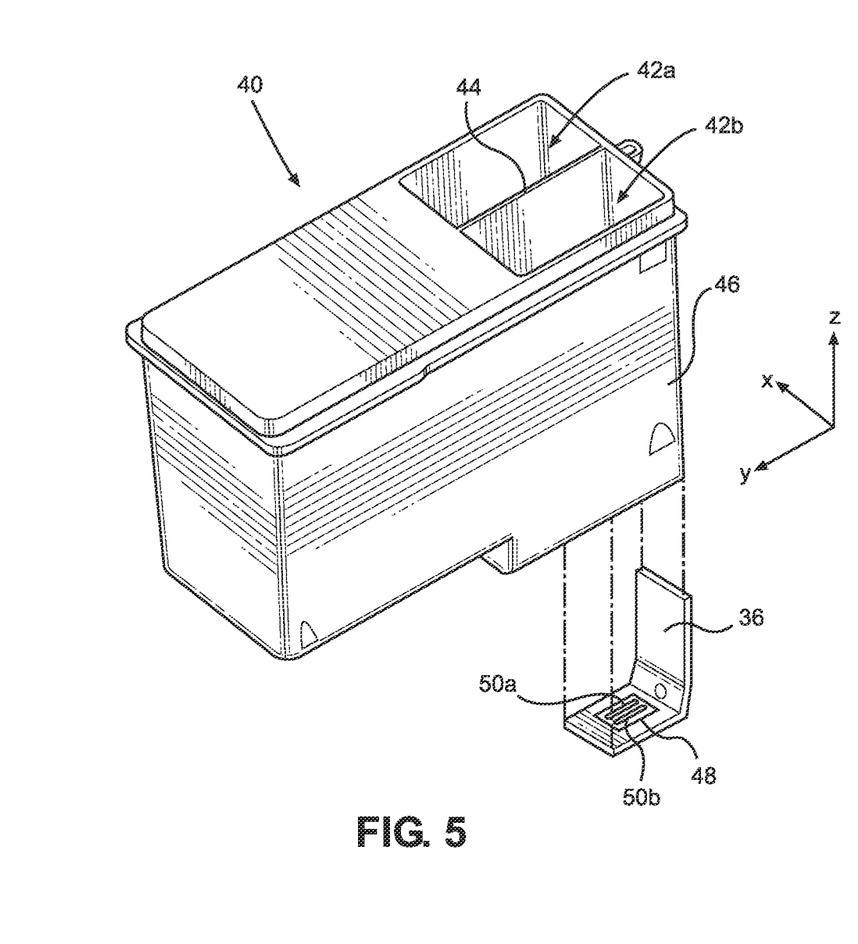
FIG. 5 is a perspective view, not to scale, of a fluid dispense cartridges containing two open chambers for use with fluid reservoirs according to the disclosure.
Figure 6:
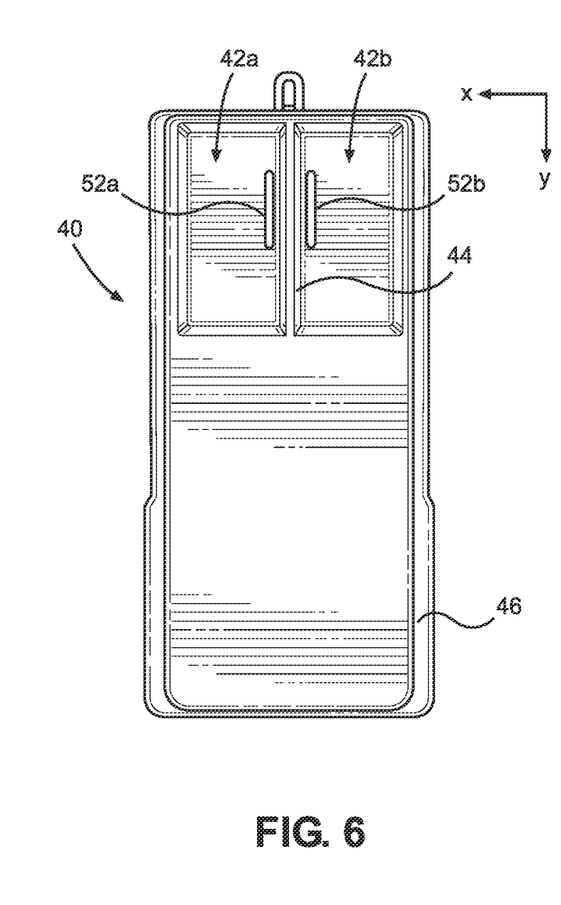
FIG. 6 is a top plan view, not to scale, of the fluid dispense cartridge of FIG. 5.

FIGS. 5 and 6 illustrate a fluid dispense cartridge 40 having two open chambers 42a and 42b therein. The fluid chambers 42a and 42b are separated from one another by a vertical dividing wall 44. The body 46 of the cartridge 40 is a similar unitary molded body to which an ejection head chip 48 containing two fluid ejector arrays 50a and 50b is attached. As shown in FIG. 6, the body 46 of the cartridge 40 is molded with two fluid supply slots 52a and 52b therein.

Figure 7:
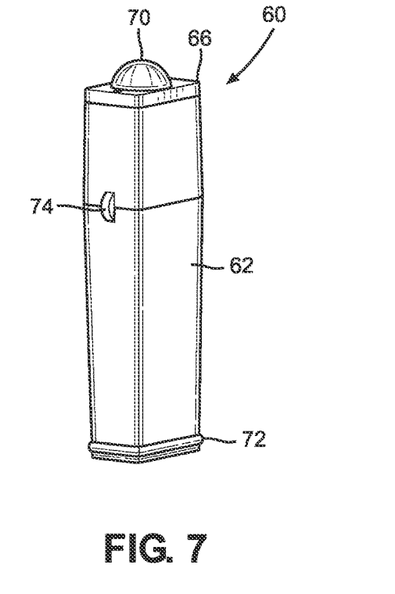
FIG. 7 is a perspective view of a fluid reservoir according to an embodiment of the disclosure.
Figure 8:
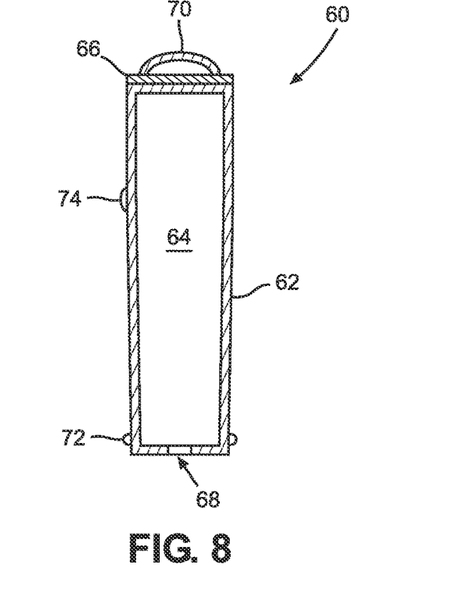
FIG. 8, is a cross-sectional view, not to scale, of the fluid reservoir of FIG. 7.

In order to provide fluid to the fluid supply slots 52a and 52b to be ejected by the ejection head chips 34 and 48, individual fluid reservoirs 60 are provided (FIGS. 7 and 8). The fluid reservoirs 60 include a rigid molded body 62 enclosing a fluid cavity 64 that may be pre-filled with fluid or may be empty and ready for a user to fill the cavity 64 with fluid. Once the cavity 64 is filled with fluid, a cover or cap 66 is attached to the body 62 of the fluid reservoir 60. A fluid outlet 68 is provided for transferring fluid from the cavity 64 to the fluid supply slot(s) in the fluid dispense cartridge 26 or 40. A pump 70 is attached to the cover 66 for the fluid reservoir 60 for inducing a flow of fluid from the fluid cavity 64 through the fluid outlet 68 and into the fluid supply slot(s) of the fluid dispense cartridge 26 or 40. The pump 70 may be a resilient bladder made of a natural or synthetic rubber material that will induce a pressure in the fluid cavity 64 when depressed by a user. A resilient sealing material 72 may be attached to the body 62 to provide a fluid tight seal within the chamber(s) of the fluid dispense cartridge 24 or 40. A tab 74 may also be provided on the body 62 of the fluid reservoir 60 to secure the fluid reservoir in the body 28 or 46 of the fluid dispense cartridge.

Figure 9:
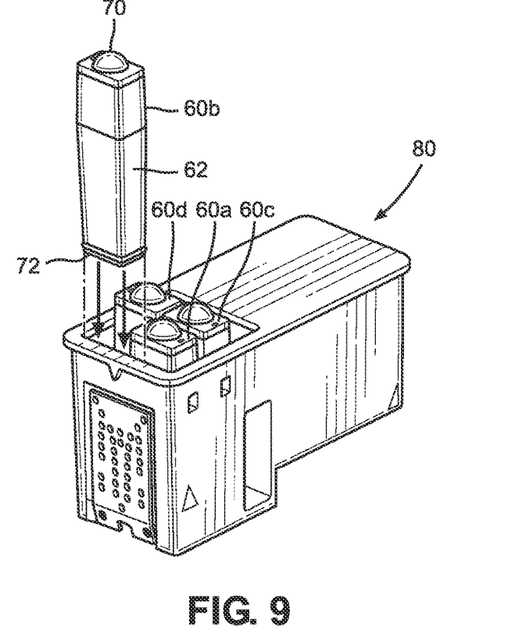
FIG. 9 is a perspective view of the fluid reservoir of FIG. 7 being inserted into fluid dispense cartridges having four open chambers therein.
Figure 10:
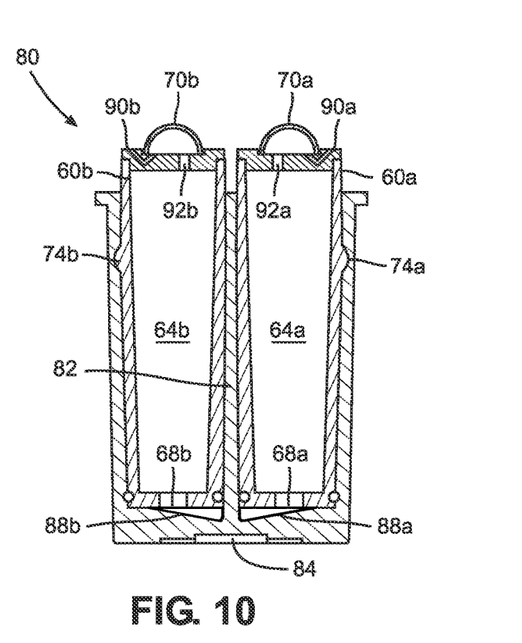
FIG. 10 is a cross-sectional view of the fluid dispense cartridge and fluid reservoirs of FIG. 9.
Figure 11:
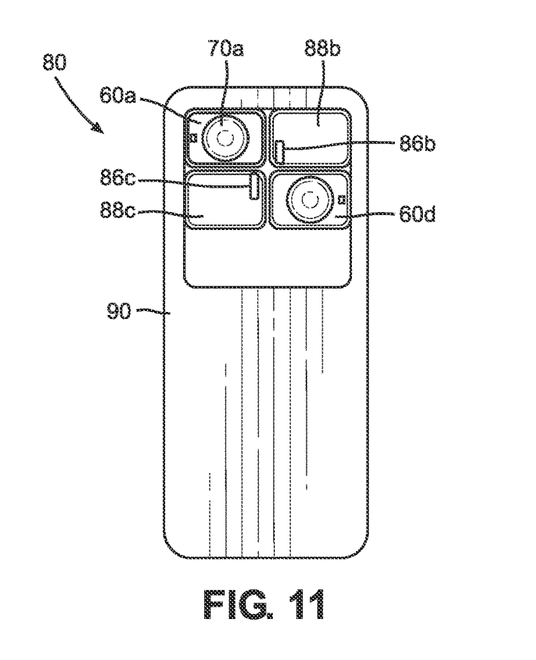
FIG. 11 is a top plan view of the fluid dispense cartridge of FIG. 7 containing only two fluid reservoirs in the open chambers thereof.
Figure 12:
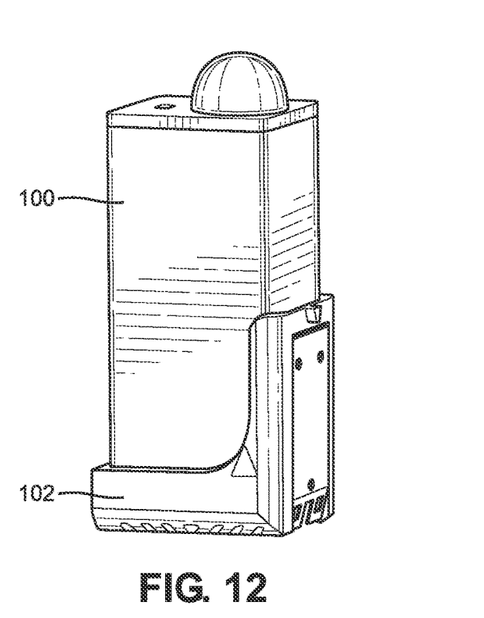
FIG. 12 is a perspective view of a fluid reservoir and fluid dispense structure according to another embodiment of the disclosure.
Figure 13:
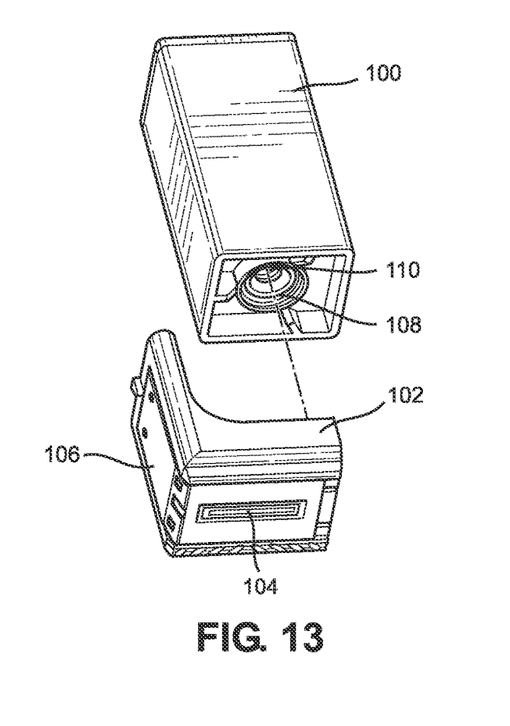
FIG. 13 is a bottom perspective view of the fluid reservoir and fluid dispense structure of FIG. 12.
Figure 14:
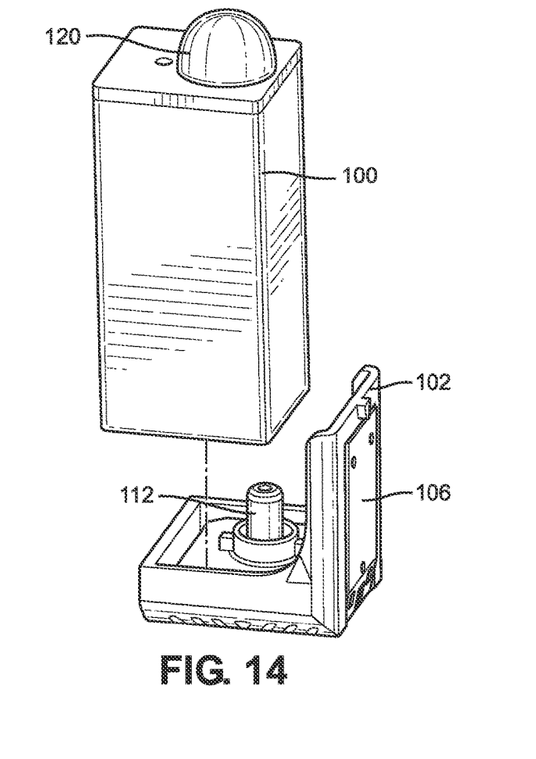
FIG. 14 is a top perspective view of the fluid reservoir and fluid dispense cartridge of FIG. 12.

FIG. 9 illustrates a fluid dispense cartridge 80 having four open chambers for the insertion of up to four fluid reservoirs 60 therein. FIG. 10 is a cross-sectional view through two fluid reservoirs 60a and 60b inserted into the fluid dispense cartridge 80 of FIG. 9. A dividing wall 82 separates the open chambers of the fluid dispense cartridge from one another. The outlets 68a and 68b are in flow communication with an ejection head 84 by means of fluid supply slots 86 in the body 90 of the fluid dispense cartridge 80 as shown in FIG. 11. FIG. 11 is a top plan view of the fluid dispense cartridge 80 of FIGS. 9-10 with only two fluid reservoirs 60a and 60d disposed in the open chambers. Bottom walls 88 of the open chambers are slanted toward the fluid supply slots 86 as shown.

Once each fluid reservoir 60 is filled with the fluid to be dispensed, the fluid reservoir 60 is inserted into the open chamber of the fluid dispense cartridge 80, and the pump 70 is depressed to cause fluid from each fluid reservoir 60 fill the fluid supply slot 86 (FIG. 11) with fluid. Typically, the open chamber of the fluid dispense cartridge 90 is devoid of fluid and therefore the ejection head chip 84 has no fluid to dispense. Accordingly, when the pump 70 is depressed, fluid is caused to fill an area above the ejection head chip 84 so that fluid can be dispensed from the cartridge 80. The pump 70 is designed to provide a precise amount of fluid to the ejection head chip 84 that is sufficient to prime the ejection head chip 84 with fluid.

Referring again to FIG. 10, the pump 70 is designed to directly pressurize the cavity 64 and fluid in the cavity 64 of the fluid reservoir 60. Accordingly, each of the covers 66 includes an air intake port 90a, 90b and an exhaust port 92a, 92b that is in air flow communication with the cavities 64 of the fluid reservoirs 60. In order to provide one way flow through the intake ports 90 and exhaust ports 92, each of the intake and exhaust ports may contain a one-way valve. In the embodiment illustrated in FIGS. 7-11, the pump 70 directly pressurizes the fluid in the cavity 64. In some embodiments, the fluid dispense cartridge does not contain a filter.

In some embodiments, illustrated in FIGS. 12-16, one or more fluid reservoirs 100 are attached to an ejection head structure 102 containing an ejection head 104 and a flexible circuit 106. The ejection head structure 102 may be used to minimize the amount of material needed to hold the fluid reservoirs 100. The fluid reservoir 100 may include an O-ring 108 in an outlet port 110 for making a fluid tight connection to a filter tower 112 attached to the ejection head structure 102. The filter tower 112 directs fluid through a filter 114 to the fluid supply slot(s) that direct fluid to the ejection head 104.

In the embodiment illustrated in FIGS. 12-16, the cavity of the fluid reservoir 100 is filled with a fluid permeable material 116 that is capable of inducing a backpressure on the ejection head 104. The fluid permeable material 116 may be selected from a foam or felt made from melamine or other material compatible with the fluid to be dispensed by the fluid dispensing device 10. The amount of fluid contained in the fluid reservoir 100 may range from about 1 to about 10 grams or more of fluid depending on the particular fluid dispensing system being used. For example, if the fluid dispensing system is an ink jet printer, the amount of fluid in each fluid reservoir may be more than 10 grams.

Figure 15:
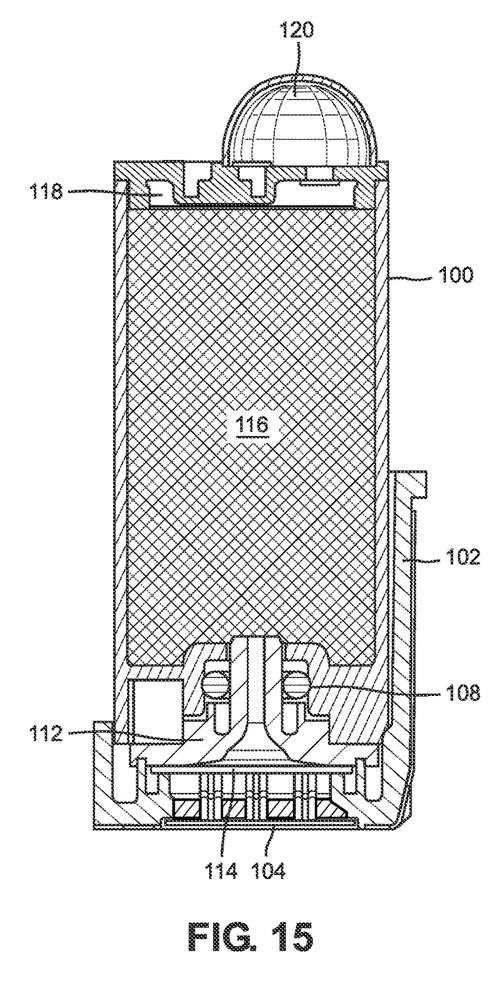
FIGS. 15-16 are cross-sectional views of the fluid reservoir and fluid dispense structure of FIG. 12 showing an inflatable bladder therein.
Figure 16:
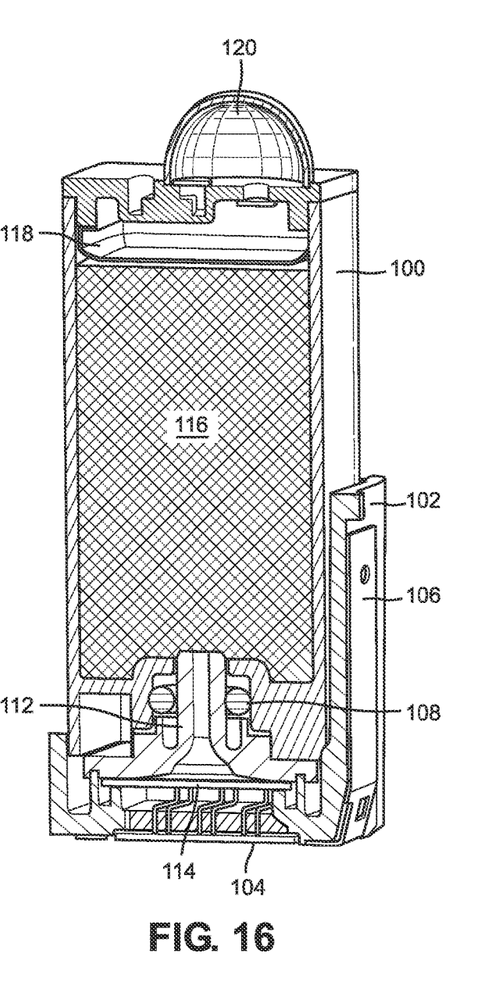

In this embodiment, a bladder 118 is used to put pressure on the fluid permeable material 116 as shown in the sequence of cross-sectional view of FIGS. 15-16 in order to cause fluid to flow out of the fluid permeable material 116 and into the filter tower 112. A pump 120 is used to inflate the bladder 118 rather than directly pressurize fluid in the cavity of the fluid reservoir 100. In FIG. 15, the bladder 118 is deflated and in FIG. 16, the bladder 118 is inflated using the pump 120.

Figure 17:
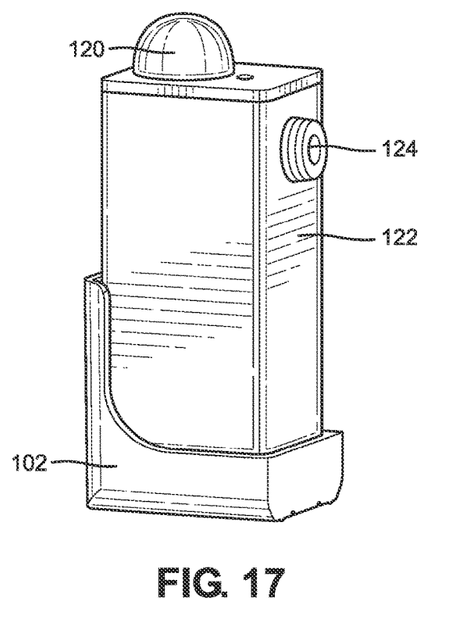
FIGS. 17 and 18 are perspective views of an alternative fluid reservoir according to an embodiment of the disclosure.
Figure 18:
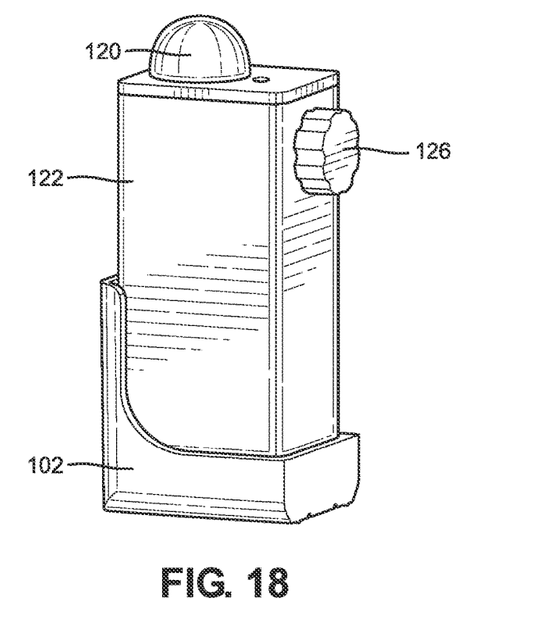
Figure 19:
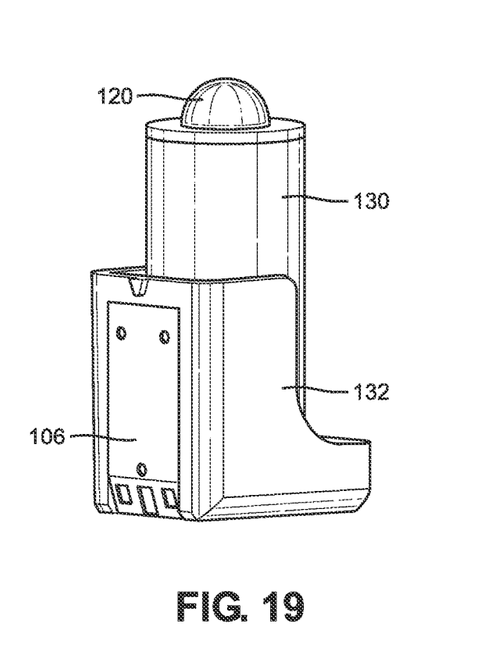
FIGS. 19 and 20 are perspective views of a cylindrical fluid reservoir and fluid dispense structure therefor according to another embodiment of the disclosure.
Figure 20:
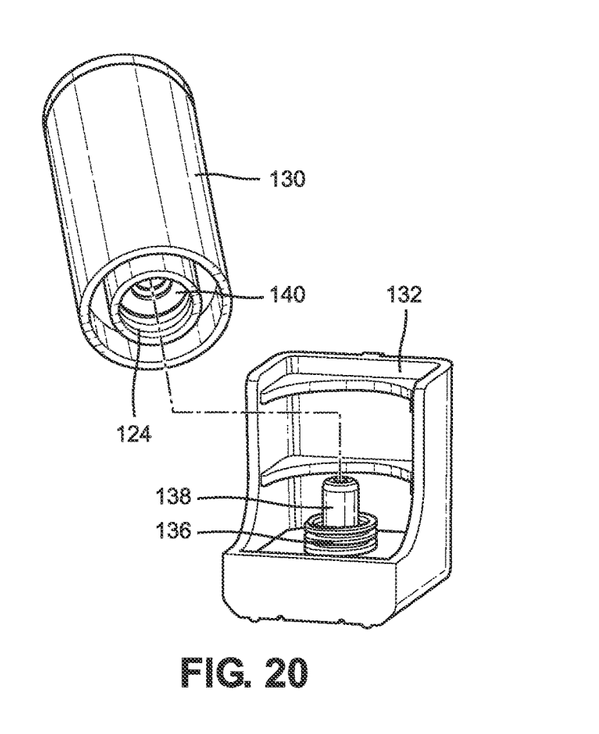
Figure 21:
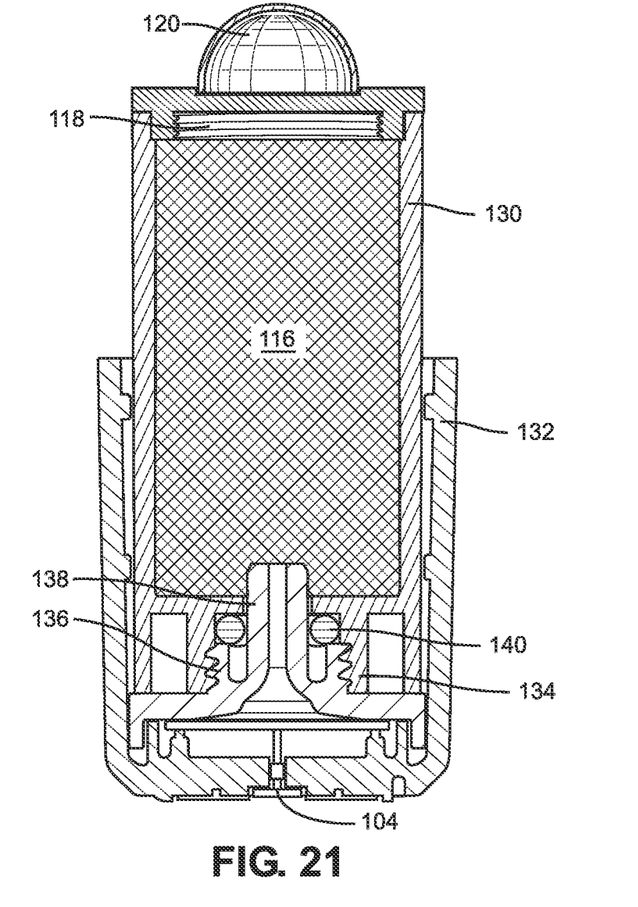
FIG. 21 is a cross-sectional view of the fluid reservoir and fluid dispense structure of FIGS. 19 and 20.
Figure 22:
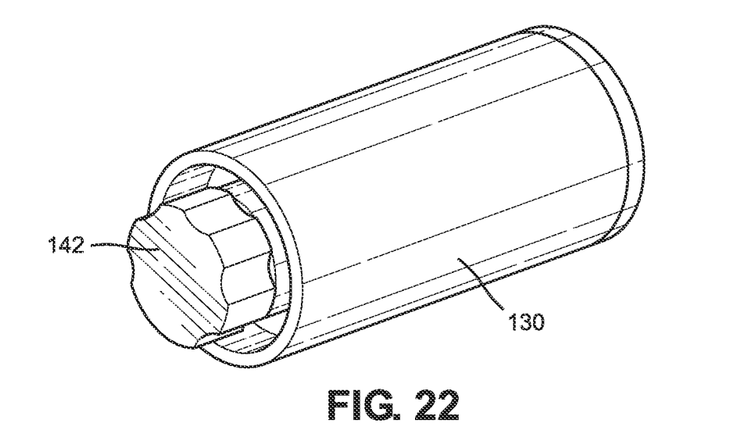
FIG. 22 is a perspective view of the fluid reservoir of FIGS. 19 and 20 containing a plug.

In an alternative embodiment, illustrated in FIGS. 17-18, the fluid reservoir 122 may include a fluid supply port 124 to fill or refill the fluid reservoir 122. A flexible tubing (not shown) may be used to provide fluid from a fluid storage container to the fluid reservoir 122 through the supply port 124. When the fluid supply port 124 is not in use, a cover 126 may be attached to the fluid reservoir 122.

In another embodiment, illustrated in FIGS. 19-22, the fluid reservoir 130 has a cylindrical shape for threadingly attaching the fluid reservoir 130 to an ejection head structure 132 instead of press fitting the reservoir 130 to the structure 132. Accordingly, the fluid reservoir 130 includes threads 134 that mate with threads 136 on a filter tower structure 138 attached to the structure 132. An O-ring seal 140 may be included in the fluid reservoir 130 to make a fluid tight seal with the filter tower structure 138 when the fluid reservoir 130 is tightened down onto the ejection head structure 132. If it is necessary or desirable to store the fluid reservoir 130 with fluid therein for later use, a plug 142 may be used to seal outlet port of the fluid reservoir 130 for future use.

Figure 23:
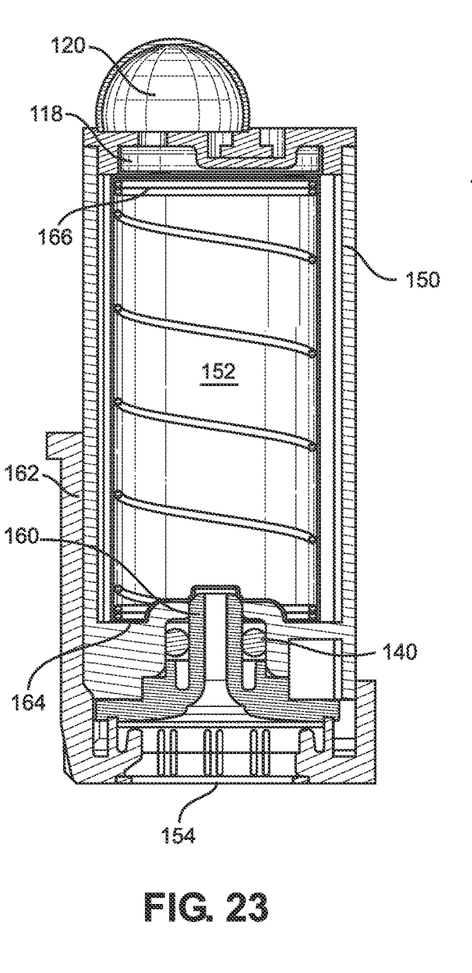
FIGS. 23-24 are cross-sectional views of a fluid reservoir according to another embodiment of the disclosure.
Figure 24:
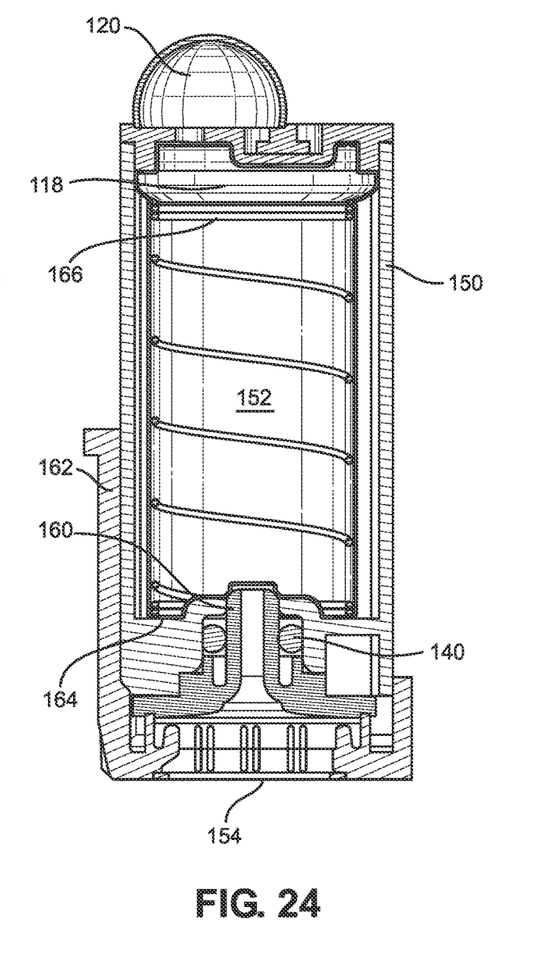

Another embodiment is illustrated in FIGS. 23-24. According to this embodiment, the fluid reservoir 150 includes a spring-loaded bladder 152 fillable with fluid rather than the fluid permeable material 116 of the previous embodiments. The spring-loaded bladder 152 provides a backpressure on the fluid therein to prevent drooling of fluid from the ejection head 154. Like the previous embodiment, the pump 120 is used to inflate the inflatable bladder 118 to put pressure on the spring-loaded bladder 152 in order to prime the ejection head 154. In FIG. 23, the bladder 118 is deflated. In FIG. 24, the bladder 118 is inflated to put pressure on the spring-loaded bladder 152 in order to cause fluid to flow into a filter tower structure 160 attached to the ejection head structure 162.

The spring-loaded bladder 152 is sealed to a floor 164 of the fluid reservoir 150, thereby preventing air from replacing a volume of fluid displaced during fluid ejection from the ejection head 154. As the volume of fluid in the spring-loaded bladder 152 decreases during fluid ejection, the spring-loaded bladder will tend to collapse. However, a spring 166 inside of the spring-loaded bladder 152 is calibrated to maintain a backpressure necessary to prevent fluid flooding the ejection head 154 as the spring 166 compresses by the collapse of the spring-loaded bladder 152. The inflatable bladder 118 provides an initial compression to the spring 166 to get fluid moving through the filter tower structure 160 in order to prime the ejection head 154.

Figure 25:
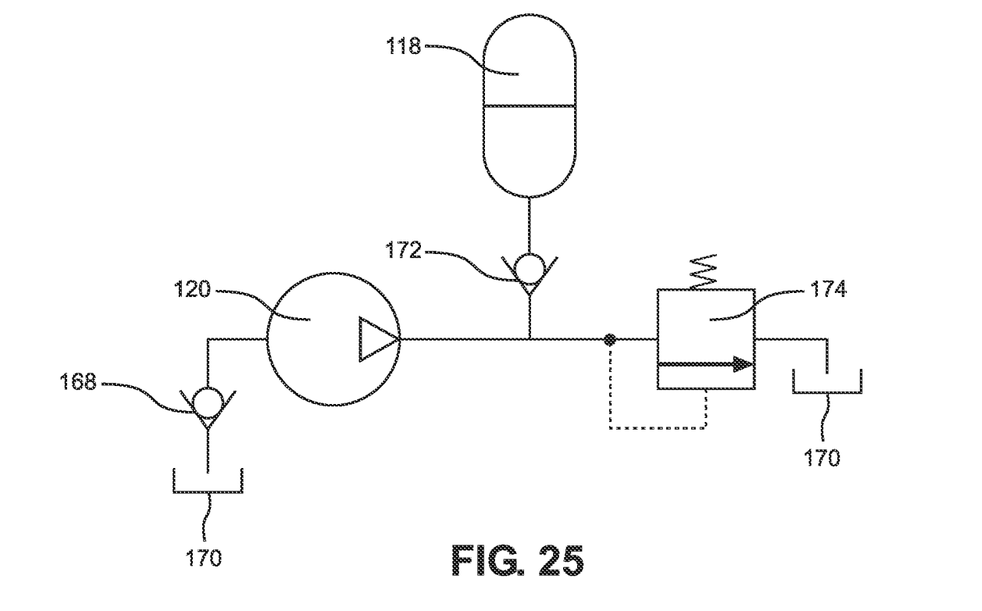
FIGS. 25-26 are schematic illustrations of pressure relief valves for inflatable bladders for fluid reservoirs according to embodiments of the disclosure.
Figure 26:
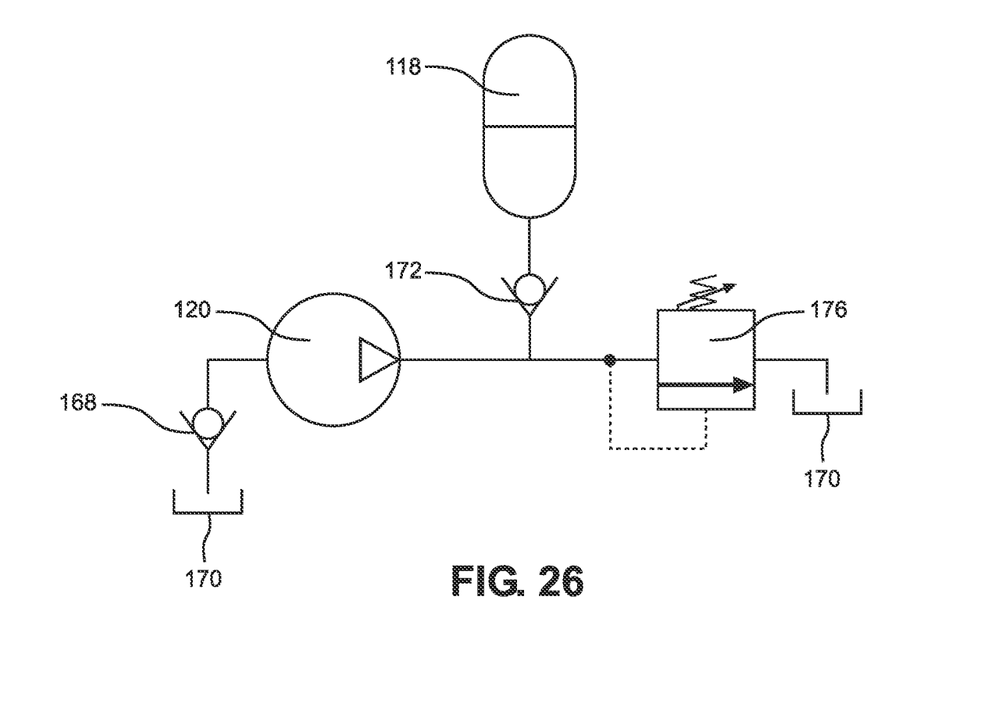

In the foregoing embodiments where an inflatable bladder 118 is used to cause fluid to flow out of the fluid reservoirs, it may be desirable to include pressure relief valve and/or a manually actuated two-position valve in gas flow communication with the bladder 118 in order to relieve the pressure inside the bladder 118 and reset the bladder 118 for reuse. FIGS. 25-26 illustrate, schematically, how a pressure valve may be included with the bladder 118 to prevent over pressurization of the bladder 118. In FIG. 25, as the pump 120 is activated, a first one-way valve 168 opens to allow air from an ambient atmospheric source 170 to flow through a second one-way valve 172 and into the bladder 118. A pressure relief valve 174 in gas flow communication with the bladder 118 prevents over-pressurization of the bladder 118 by relieving any pressure above a predetermined set pressure back into the ambient atmospheric source 170. In FIG. 26, a variable pressure relief valve 176 is provided instead of the fixed pressure relief valve 174. A user may set the relief pressure for the variable pressure relief valve 176 depending on the density and viscosity of the fluid in the fluid reservoir.

Figure 27:
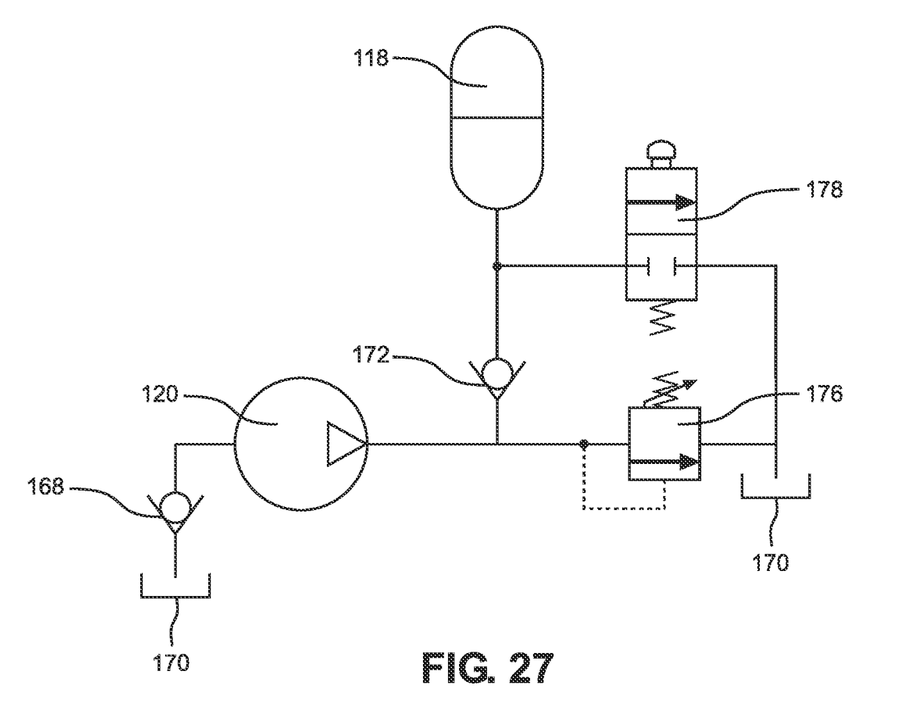
FIG. 27 is a schematic illustration of a manually actuated two-position valve for manually resetting a deformable bladder for reuse.

FIG. 27 illustrates an alternative embodiment in which a normally closed, manually actuated two-position valve 178 in combination with the variable pressure relief valve 176 is provided in flow communication with the bladder 118. A user may manually actuate the two-position valve 178 to allow air to escape from the bladder 118 so that the bladder 118 can be reset and reused. Accordingly, the fluid reservoirs described above may be used multiple times to provide fluid to be dispensed by the fluid dispense device 10 described above.

The foregoing reservoirs may be used for a variety of fluids used for medical analysis purposes, or for conventional ink jet printing applications. In the case of medical analysis fluids, the disclosed embodiments enable users to insert fluids into the reservoirs on an as-needed basis rather than using pre-filled fluid reservoirs that may spoil during shipping and storage. Likewise, for ink jet printing applications using pigment-based inks, the reservoirs may be filled just prior to use, thereby avoiding pigment settling problems with pigment-based inks that are shipped and stored in pre-filled cartridges. The fluid reservoirs may then be primed using the pump as described above to ensure that fluid is readily available for ejection by the fluid ejection heads.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid dispense cartridge comprising a fluid ejection head and at least one open chamber therein configured to accept a replaceable fluid reservoir therein, the replaceable fluid reservoir comprising an enclosed fluid cavity therein configured for containing fluid, a fluid outlet in fluid flow communication with the enclosed fluid cavity, a flow inducing pump attached to the replaceable fluid reservoir opposite the fluid outlet; a fluid disposed in the fluid cavity; and an inflatable bladder configured to indirectly pressurize the fluid in the fluid cavity using the flow inducing pump, wherein the inflatable bladder is disposed within the replaceable fluid reservoir between the enclosed fluid cavity and the flow inducing pump.

2. The fluid dispense cartridge of claim 1, wherein the enclosed fluid cavity is filled with a backpressure device containing the fluid.

3. The fluid dispense cartridge of claim 2, wherein the backpressure device comprises a fluid permeable foam.

4. The fluid dispense cartridge of claim 3, wherein the inflatable bladder is configured for compressing the fluid permeable foam to induce fluid flow through the fluid outlet.

5. The fluid dispense cartridge of claim 4, wherein the replaceable fluid reservoir further comprises a pressure relief valve in flow communication with the inflatable bladder to provide a predetermined pressure in the inflatable bladder.

6. The fluid dispense cartridge of claim 4, wherein the replaceable fluid reservoir further comprises a two-position valve configured to manually release pressure from the inflatable bladder so that the replaceable fluid reservoir can be refilled with fluid.

7. The fluid dispense cartridge of claim 2, wherein the backpressure device comprises a fluid-fillable, spring-loaded bladder.

8. The fluid dispense cartridge of claim 7, wherein the inflatable bladder is configured for compressing the spring-loaded bladder to induce fluid flow through the fluid outlet.

9. The fluid dispense cartridge of claim 8, wherein the replaceable fluid reservoir further comprises a pressure relief valve in flow communication with the inflatable bladder to provide a predetermined pressure in the inflatable bladder.

10. The fluid dispense cartridge of claim 1, wherein the replaceable fluid reservoir comprises a rectangular prism-shaped body having a tab thereon configured for positively attaching the replaceable fluid reservoir to the fluid dispense cartridge.

11. The fluid dispense cartridge of claim 1, wherein the replaceable fluid reservoir comprises a cylindrical body having threads thereon for threadingly attaching the replaceable fluid reservoir to a fluid dispense cartridge.

12. The fluid dispense cartridge of claim 1, wherein the replaceable fluid reservoir further comprises an O-ring seal configured for sealing the replaceable fluid reservoir to the fluid dispense cartridge.

13. The fluid dispense cartridge of claim 1, wherein the replaceable fluid reservoir further comprises a fluid filling port thereon for filling or refilling the replaceable fluid reservoir with fluid.

14. A method for priming a fluid ejection head for a fluid dispensing device, comprising:
providing a fluid dispense structure comprising a fluid ejection head;
attaching a replaceable fluid reservoir to the fluid dispense structure, wherein the replaceable fluid reservoir comprises an enclosed fluid cavity therein containing a fluid, a fluid outlet in fluid flow communication with the enclosed fluid cavity, a flow inducing pump attached to the replaceable fluid reservoir opposite the fluid outlet; and an inflatable bladder configured to indirectly pressurize the fluid in the fluid cavity using the flow inducing pump, wherein the inflatable bladder is disposed within the replaceable fluid reservoir between the enclosed fluid cavity and the flow inducing pump; and
activating the flow inducing pump to inflate the inflatable bladder to pressurize the fluid and to cause fluid to flow from the outlet of the replaceable fluid reservoir into the fluid ejection head to prime the fluid ejection head with fluid from the replaceable fluid reservoir.

15. The method of claim 14, wherein the replaceable fluid reservoir is pre-filled with the fluid to be dispensed by the fluid dispensing device.

16. The method of claim 14, further comprising filling the replaceable fluid reservoir with fluid to be dispensed by the fluid dispensing device prior to attaching the replaceable fluid reservoir to the fluid dispense structure.

17. The method of claim 14, wherein the fluid dispense structure comprises one or more open chambers therein, further comprising inserting a replaceable fluid reservoir into each of the one or more open chambers; and activating the flow inducing pump on each replaceable fluid reservoir.

18. The method of claim 17, wherein each replaceable fluid reservoir contains a different fluid.

19. A replaceable fluid reservoir for a fluid dispense cartridge, the replaceable fluid reservoir comprising an enclosed fluid cavity therein configured for containing fluid, a fluid outlet in fluid flow communication with the enclosed fluid cavity, a flow inducing pump attached to the replaceable fluid reservoir opposite the fluid outlet; a fluid disposed in the fluid cavity; and an inflatable bladder configured to indirectly pressurize the fluid in the fluid cavity using the flow inducing pump, wherein the inflatable bladder is disposed within the replaceable fluid reservoir between the enclosed fluid cavity and the flow inducing pump.

20. The replaceable fluid reservoir of claim 19, wherein the enclosed fluid cavity is filled with a backpressure device containing the fluid.

21. The replaceable fluid reservoir of claim 20, wherein the inflatable bladder is configured for compressing the backpressure device to induce fluid flow through the fluid outlet.

* * * * *